United States Patent
Clark et al.

(10) Patent No.: US 10,635,995 B2
(45) Date of Patent: Apr. 28, 2020

(54) SYSTEMS AND METHODS FOR FACILITATING EVENT ACCESS THROUGH PAYMENT ACCOUNTS

(71) Applicant: MASTERCARD INTERNATIONAL INCORPORATED, Purchase, NY (US)

(72) Inventors: Kyle P. Clark, High Ridge, MO (US); Travis M. Carpenter, Glencoe, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 523 days.

(21) Appl. No.: 15/062,635

(22) Filed: Mar. 7, 2016

(65) Prior Publication Data
US 2017/0255882 A1    Sep. 7, 2017

(51) Int. Cl.
*G06Q 10/02* (2012.01)
*G06Q 20/38* (2012.01)
(Continued)

(52) U.S. Cl.
CPC ........... *G06Q 10/02* (2013.01); *G06Q 20/342* (2013.01); *G06Q 20/36* (2013.01); *G06Q 20/385* (2013.01)

(58) Field of Classification Search
CPC ..... G06Q 10/02; G06Q 20/204; G06Q 20/407
(Continued)

(56) References Cited

U.S. PATENT DOCUMENTS 6,128,601 A   10/2000  Van Horne et al.
6,738,750 B2   5/2004  Stone et al.
(Continued)

FOREIGN PATENT DOCUMENTS

EP    1335310    8/2003
EP    2911097    8/2015
(Continued)

OTHER PUBLICATIONS

Ticketmaster, "Ticket Master Credit Card Entry"/ available at https://www.ticketmaster.com/creditcardentry, accessed via internet archive (Year: 2013).*

(Continued)

*Primary Examiner* — Kevin H Flynn
*Assistant Examiner* — Emmett K. Walsh
(74) *Attorney, Agent, or Firm* — Harness, Dickey & Pierce, P.L.C.

(57) ABSTRACT

Exemplary systems and methods for facilitating access to events based on associations between payment accounts and such access are disclosed. One exemplary method includes receiving, at a computing device, an access request for an event where the access request is associated with a consumer requesting access to the event, and searching, by the computing device, in a data structure for a payment account identified in the request. When the identified payment account is found, the method includes verifying, by the computing device, that the identified payment account is associated with the event. And, when association of the payment account and the event is verified, the method includes causing, by the computing device, an access output to be generated at the event, whereby the consumer is permitted access to the event, based on the access output, without separately presenting credentials.

11 Claims, 4 Drawing Sheets

(51) Int. Cl.
*G06Q 20/36* (2012.01)
*G06Q 20/34* (2012.01)

(58) Field of Classification Search
USPC .......................................................... 705/5
See application file for complete search history.

(56) References Cited

U.S. PATENT DOCUMENTS

| | | |
|---|---|---|
| 7,376,839 B2 | 5/2008 | Carta et al. |
| 7,527,208 B2 | 5/2009 | Hammad et al. |
| 7,631,803 B2 | 12/2009 | Peyret et al. |
| 7,778,935 B2 | 8/2010 | Colella |
| 8,688,554 B2 | 4/2014 | Hammad et al. |
| 8,733,663 B2 | 5/2014 | Hammad et al. |
| 8,738,485 B2 | 5/2014 | Dixon et al. |
| 9,118,656 B2 | 8/2015 | Ting et al. |
| 2003/0028814 A1 | 2/2003 | Carta et al. |
| 2004/0006497 A1* | 1/2004 | Nestor ................ G06Q 10/02 705/5 |
| 2004/0164143 A1 | 8/2004 | Haley |
| 2004/0215963 A1 | 10/2004 | Kaplan |
| 2006/0020517 A1 | 1/2006 | Brooks et al. |
| 2006/0059365 A1 | 3/2006 | Harper |
| 2007/0017976 A1 | 1/2007 | Peyret et al. |
| 2007/0051797 A1* | 3/2007 | Randolph-Wall ...... G06Q 20/10 235/381 |
| 2007/0186106 A1 | 8/2007 | Ting et al. |
| 2007/0214093 A1 | 9/2007 | Colella |
| 2009/0171682 A1 | 7/2009 | Dixon et al. |
| 2009/0184163 A1 | 7/2009 | Hammad et al. |
| 2010/0082374 A1* | 4/2010 | Charania ................ G06Q 10/02 705/5 |
| 2010/0228576 A1 | 9/2010 | Marti et al. |
| 2010/0320268 A1 | 12/2010 | Brooks et al. |
| 2011/0119098 A1 | 5/2011 | Miller et al. |
| 2012/0032782 A1* | 2/2012 | Colella ................ G06Q 20/385 340/5.83 |
| 2012/0036073 A1* | 2/2012 | Basu ...................... G06Q 20/40 705/44 |
| 2012/0185394 A1* | 7/2012 | Gelfand ................ G06Q 10/02 705/44 |
| 2013/0008958 A1 | 1/2013 | Smith et al. |
| 2013/0151292 A1* | 6/2013 | Van Deloo ............ G06Q 10/02 705/5 |
| 2013/0179201 A1 | 7/2013 | Fuerstenberg et al. |
| 2014/0149293 A1* | 5/2014 | Laracey ............... G06Q 20/108 705/44 |
| 2014/0192197 A1* | 7/2014 | Hanko ................ H04L 12/2829 348/156 |
| 2014/0372308 A1* | 12/2014 | Sheets ................... G06Q 20/40 705/44 |
| 2015/0269559 A1 | 9/2015 | Inotay et al. |
| 2015/0327072 A1* | 11/2015 | Powell .................... H04L 67/04 455/411 |

FOREIGN PATENT DOCUMENTS

| | | | |
|---|---|---|---|
| WO | WO01/84504 | 11/2001 | |
| WO | Wo-0184504 A2 * | 11/2001 | ............ G06Q 10/02 |
| WO | WO2008/070781 | 6/2008 | |

OTHER PUBLICATIONS

Ticketmaster Credit Card Entry; www.ticketmaster.com/creditcardentry; accessed Oct. 20, 2015; 2 pgs.
U.S. Appl. No. 14/542,228, filed Nov. 14, 2014, Richard Lynch.
U.S. Appl. No. 15/334,665, filed Oct. 26, 2016, Clark et al.

* cited by examiner

SYSTEMS AND METHODS FOR FACILITATING EVENT ACCESS THROUGH PAYMENT ACCOUNTS

FIELD

The present disclosure generally relates to systems and methods for facilitating access to events, by associating payment accounts with such access to the events.

BACKGROUND

This section provides background information related to the present disclosure which is not necessarily prior art.

Often, payment accounts are used by consumers to purchase tickets for events such as, for example, sporting events, concerts, transit/travel events, etc. Typically, once the tickets are purchased, they are delivered to the consumers, in person, by mail, or electronically. The tickets may be hard tickets (e.g., paper tickets, etc.) encoded with holograms and/or other security mechanisms, and which are physically delivered to the consumers from the event organizers. Other tickets may be electronic tickets that are delivered to the consumers via email or otherwise from the event organizers. In either case, the tickets are then physically presented by the consumers, at the site of the events, in order for the consumers to gain access to the events.

DRAWINGS

The drawings described herein are for illustrative purposes only of selected embodiments and not all possible implementations, and are not intended to limit the scope of the present disclosure.

Figure 1:
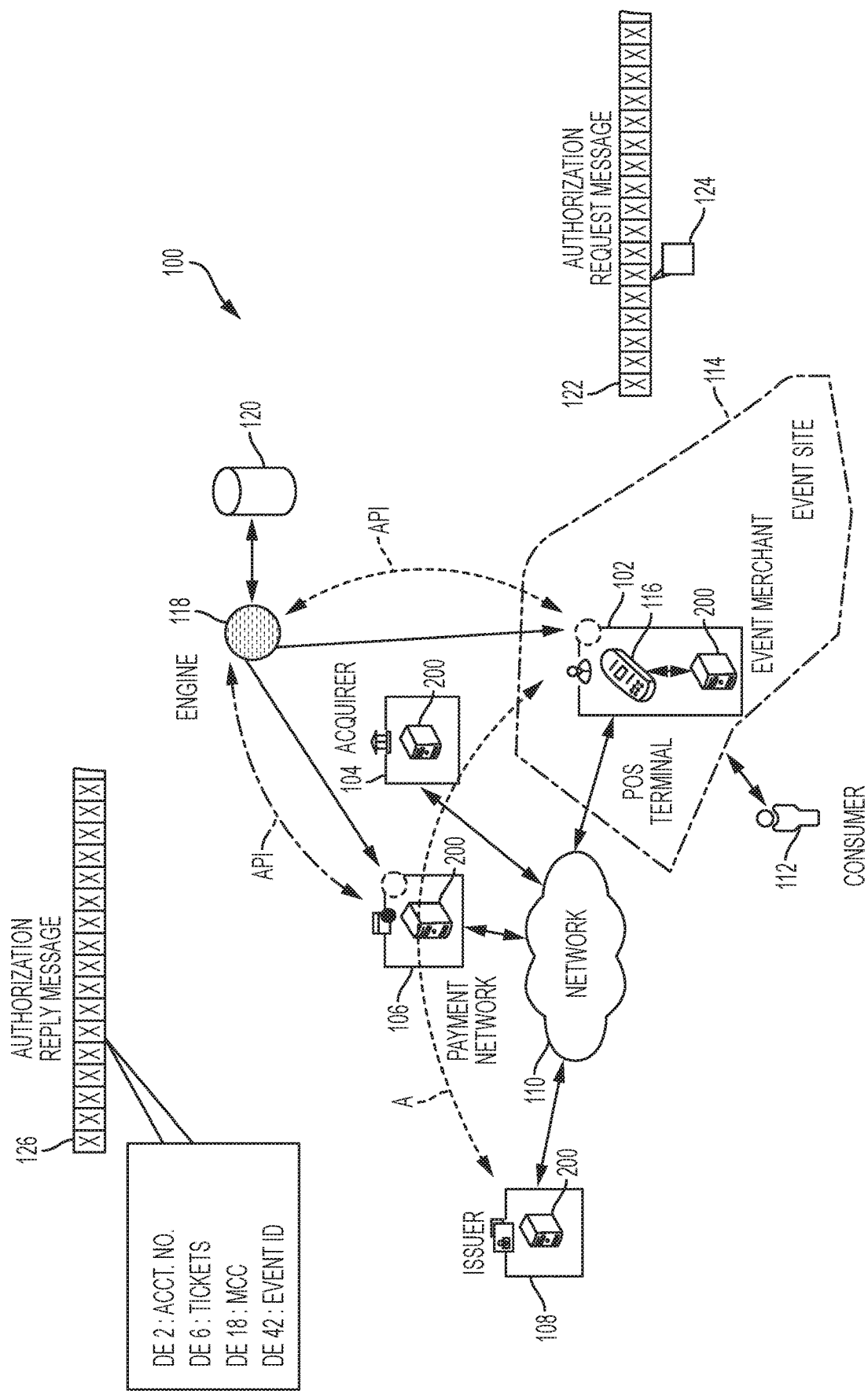
FIG. 1 is a block diagram of an exemplary system of the present disclosure suitable for use in associating access to events, for consumers purchasing such access, with payment accounts of the consumers and for facilitating such access by the consumers to the events based on the association.
Figure 3:
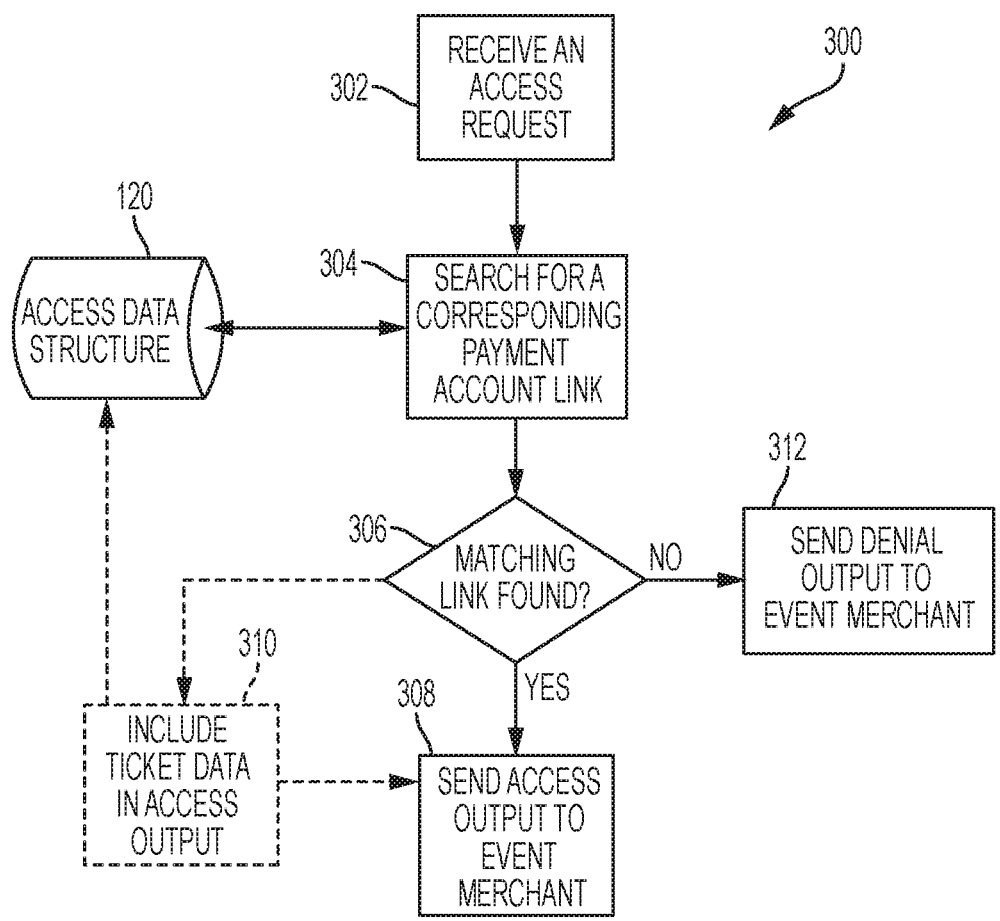
Figure 4:
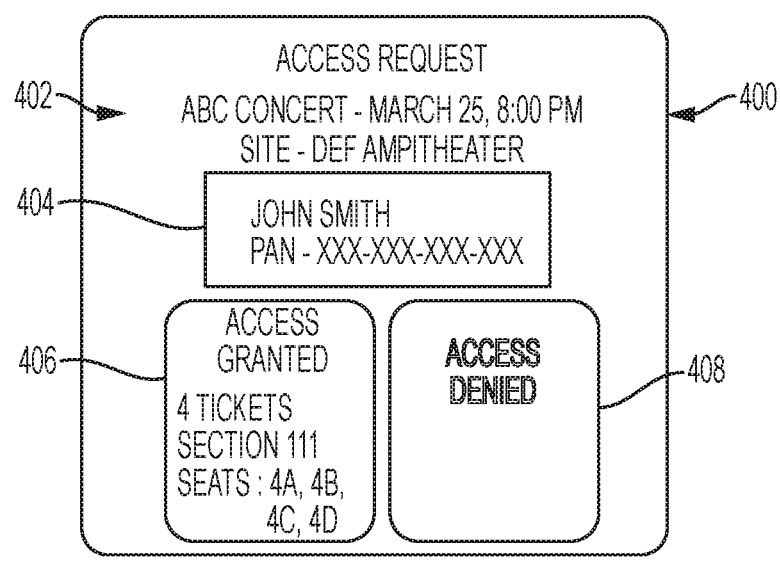

FIG. 3 is an exemplary method, suitable for use with the system of FIG. 1, for facilitating access to an event, for a consumer, through use of a payment account associated with the consumer; and FIG. 4 is an exemplary access interface that may be displayed in connection with the system of FIG. 1 and/or the method of FIG. 3, for facilitating access to an event, for a consumer, through use of a payment account associated with the consumer.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Tickets, whether in hard or electronic form, are often employed to control access to events. Typically, event merchants offer the tickets for sale and sell the tickets to consumers, who then present the tickets at the events in order to gain access to the events. Uniquely, the systems and methods herein facilitate access to events by linking payment accounts associated with consumers purchasing tickets to the events and the tickets purchased, whereby the consumers may then employ payment devices (associated with the linked payment accounts) to gain access to the events via interaction with a payment network (and in lieu of physically presenting the purchased tickets). For example, the systems and methods herein may employ an access engine, coupled to the payment network, and a variety of links that associate the tickets purchased by the consumers for the events with payment accounts associated with the consumers. Then, to gain access to the events, the consumers present payment account information (often, in the form of payment devices (e.g., credit cards, e-wallet identifiers, debit cards, fobs, etc.)), at the sites of the events. In turn, the event merchants submit authorization messages to the payment network. The authorization messages are designated as access request messages and are routed at least to the access engine, which then determines whether the payment accounts identified in the messages are linked to tickets for the events. If such links exist, the access engine causes authorization messages to be returned to the event merchants. The returned authorization messages received at the event merchants may include a variety of information, but at the least generally include sufficient information for the event merchants to permit or not permit access for the consumers to the events.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, processing of transactions in the system 100, etc.

The system 100 generally includes an event merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the event merchant 102, the payment network 106, and a consumer 112 (or a communication device associated with the consumer 112), etc.

The event merchant 102 is generally associated with one or more events, such as for example, sporting events, movies, concerts, transit/travel events, etc., to which the event merchant 102 offers access for sale to consumers in the system 100, including consumer 112. The events are often associated with an event site 114, at which the events are located. The event site 114 may include, for example, a concert venue, a sports area, a bus, an airplane, a theatre, or another location, vehicle, or transport, often depending on the type of event, etc. The event merchant 102 may be located at the site of the event (i.e., at the event site 114), as shown in FIG. 1, or geographically separate from the event site 114, in one or more other locations. What's more, the event merchant 102 may include multiple parts/entities located at different areas, for example, at the event site 114 and at other sites, etc. Further, the event merchant 102 may be associated with multiple event sites (including the event site 114) and access thereto, and/or may also be associated with one or more other products (e.g., goods and/or services, etc.) for sale (i.e., as a traditional merchant). It should be appreciated that, while only one event merchant 102, one consumer 112, and one event site 114 are illustrated in the system 100 for ease of reference, multiple event merchants and/or consumers and/or event sites may be included in the system 100 in other embodiments.

The event merchant 102 is also associated with a point-of-sale (POS) terminal 116. In this exemplary embodiment, the POS terminal 116 may include, or may be associated with, an internet-based application, which is provided to cause the POS terminal 116 to operate as described herein. In particular, the POS terminal 116 may be configured, by the application, to interact with an access engine 118 to transmit authorization requests, to receive authorization replies, and to, when appropriate, present access outputs or denial outputs to the event merchant 102 and/or the consumer 112. This will be described in more detail hereinafter.

With continued reference to FIG. 1, the consumer 112 may purchase tickets from the event merchant 102 through a variety of different payment types. In the illustrated embodiment, the consumer 112 purchases tickets to an event at the event merchant 102, by use of a payment account.

For example, the consumer 112 may initiate a transaction with the event merchant 102, for the purchase of a ticket (or multiple tickets) to a desired event, by presenting a payment device associated with the consumer's payment account to the event merchant 102 (e.g., a credit card, a debit card, a fob, a smartcard, an internet-based e-wallet application, etc.). The payment device may be presented at the POS terminal 116 (or otherwise), which reads or otherwise receives payment account information therefrom. In turn, the event merchant 102 submits an authorization request (broadly, a transaction message) to the acquirer 104 (associated with the event merchant 102) for the transaction, to determine whether the payment account is in good standing and whether there is sufficient funds and/or credit to cover the transaction. The authorization request is transmitted along path A in the system 100, as referenced in FIG. 1. The acquirer 104 communicates the authorization request with the issuer 108 (associated with the consumer's payment account), through the payment network 106, such as, for example, through MasterCard®, VISA®, Discover®, American Express®, etc. In turn, if approved, an authorization reply or response (indicating the approval of the transaction) (broadly, a transaction message) is transmitted back from the issuer 108 to the event merchant 102, along path A, thereby permitting the event merchant 102 to complete the transaction. The transaction is later cleared and/or settled (via appropriate transaction messages such as clearing messages and/or settlement messages) by and between the event merchant 102, the acquirer 104, and the issuer 108 (by appropriate agreements). If declined, however, the authorization reply (indicating a decline of the transaction) is provided back to the event merchant 102, along the path A, thereby permitting the event merchant 102 to halt or terminate the transaction.

In connection with the above transaction, both the authorization request and the authorization reply include an ISO 8583 authorization message (broadly, an ISO 8583 transaction message). It should be appreciated that similar transactions may be performed between the consumer 112 and the event merchant 102 apart from the POS terminal 116 (e.g., via the Internet, via a telephone, etc.).

Transaction data is generated, collected, and stored as part of the above interactions among the event merchant 102, the acquirer 104, the payment network 106, the issuer 108, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the event merchant 102, the acquirer 104 and/or the issuer 108 may store the transaction data, or part thereof, in a data structure, or transaction data may be transmitted between parts of system 100 as used or needed. The transaction data may include, for example, primary account numbers (PANs) for consumers involved in the transactions, amounts of the transactions, merchant IDs for merchants involved in the transactions, merchant category codes (MCCs), dates/times of the transactions, products purchased and related descriptions or identifiers, etc. It should be appreciated that more or less information related to transactions, as part of either authorization or clearing and/or settling, may be included in transaction records and stored within the system 100, at the event merchant 102, the acquirer 104, the payment network 106 and/or the issuer 108.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

Further, while one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure.

Figure 2:
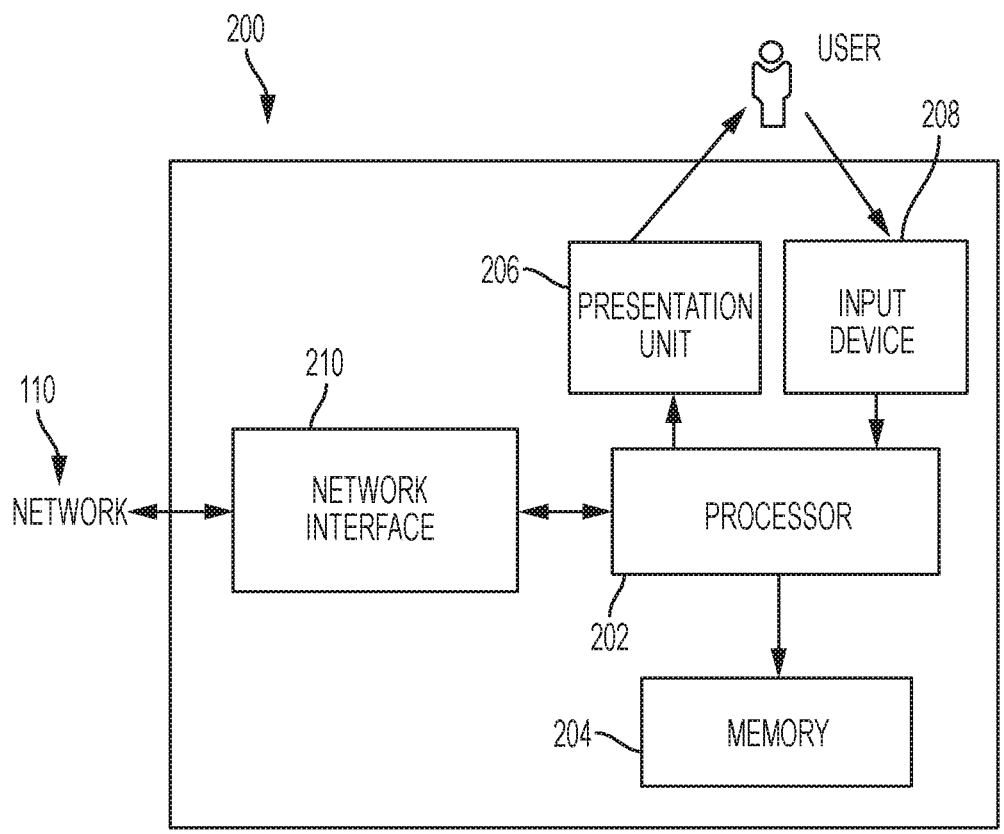
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the event merchant 102, the acquirer 104, the payment network 106, and the issuer 108 are illustrated as including, or being implemented in, computing device 200, coupled to (and in communication with) the network 110. In addition, the POS terminal 116 and the access engine 118 may each be considered a computing device consistent with computing device 200. And, the POS terminal 116 may be configured to communicate with the computing device 200 of the event merchant 102 to accomplish one or more operations described herein. Further, the computing devices 200 associated with these parts of the system 100, for example, may include a single computing device, or multiple computing devices located in close proximity or distributed over a geographic region, again so long as the computing devices are specifically configured to function as described herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account links, ticket purchase history and/or details (e.g., number of tickets, event IDs, event date/time, event site, event descriptions, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in connection with one or more of the functions or processes described herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., access outputs, denial outputs, etc.), visually, for example, to a user of the computing device 200, such as the consumer 112 in the system 100 (e.g., via a portable communication device consistent with computing device 200, etc.); users associated with one or more of the event merchant 102 and/or the POS terminal 116; etc. It should be further appreciated that various interfaces (e.g., as defined by internet-based applications, websites, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices. Additionally or alternatively, the presentation unit 206 may include printing capability, enabling the computing device 200 to print text, images, and the like on paper and/or other similar media. For instance, the POS terminal 116 may print out access and/or event information, as described below.

In addition, the computing device 200 includes an input device 208 that receives inputs from the user (i.e., user inputs) such as, for example, loyalty account information, etc. The input device 208 may include a single input device or multiple input devices. The input device 208 is coupled to (and in communication with) the processor 202 and may include, for example, one or more of a keyboard, a pointing device, a mouse, a stylus, a magnetic stripe reader, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the access engine 118 is specifically configured, by computer executable instructions, to perform one or more of the operations described herein. The access engine 118 is illustrated as a stand-alone device in the system 100. However, as indicated by the solid arrow lines in FIG. 1 extending from the engine 118, the access engine 118 may alternatively be associated with, or incorporated with, the payment network 106 and/or the issuer 108. Further, in various other embodiments, it should be appreciated that the access engine 118 may be associated with, or incorporated with, still other parts of the system 100, for example, the acquirer 106, the issuer 108, etc.

In the above example transaction, when the purchase of the ticket from the event merchant 102 is completed by the consumer 112, the access engine 118 is configured to generate a link (or association) between the ticket and a payment account associated with the consumer 112. The payment account may be the payment account used by the consumer 112 to purchase the ticket, or it may include another payment account associated with the consumer (e.g., as directed by the consumer 112, etc.). The link between the ticket purchased by the consumer 112 and the consumer's payment account is then stored in an access data structure 120 associated with the access engine 118 (e.g., in memory 204 included in the access engine 118, etc.).

In several embodiments, the link between the ticket purchased by the consumer 112 and the consumer's payment account is generated, by the access engine 116, in response to the transaction for the ticket. In connection therewith, the transaction messaging (e.g., the ISO 8535 message associated with authorization request in the above purchase transaction, etc.) may include indicators of the ticket purchase transition (e.g., as included in transaction data in the message, such as a particular MCC for the event merchant 102, a particular transaction ID for the ticket, etc.; etc.) to indicate to the access engine 118 to act thereon.

In various embodiments, when the example transaction occurs at the POS terminal 116, the POS terminal 116 may communicate with the access engine 118, via the payment network 106, or alternatively, through network 110, independent of the transaction, to provide at least the necessary event purchase details to the engine 118. In these embodiments, the event merchant 102 and/or the consumer 112 indicates to the access engine 118, or otherwise enrolls with the access engine 118, to generate the link between the ticket purchased by the consumer 112 and the consumer's payment account automatically, when the ticket is purchase. Additionally, or alternatively, the access engine 118 may be associated with an internet-based application, whereby the consumer 112 may register the purchased ticket to the consumer's selected payment account, to enable the subsequent access interactions for the event corresponding to the ticket, as described below.

In the illustrated embodiment, the access engine 118 includes an application programming interface (API), which may be called by the event merchant 102 (e.g., by the POS terminal 116 when used to perform the purchase transaction for the ticket, etc.) and/or the issuer 108, etc. A call to the API in the system 100 is indicated by the dotted lines in FIG. 1. It should be appreciated that the engine 118 may include other APIs in other embodiments, which may be called by the same and/or other parts of the system 100 (e.g., an internet-based application active in a communication device associated with the consumer 112, etc.) to access, create, edit, add, or delete, one or more payment account links, or otherwise manage the consumer's account.

Once the links are generated by the access engine 118, and when the consumer 112 then attempts to gain access to the event associated with the purchased ticket, the access engine 118 facilitates the requested access (without the consumer 112 needing to present the physical ticket). In particular, at the event site 114 in the system 100, the consumer 112 presents information to the event merchant 102 regarding the payment account linked to the purchased ticket for the event (e.g., via the POS terminal 116, etc.). In so doing, the event merchant 102 generates an authorization request message 122 for the event that is transmitted through the payment network 106, along path A. The access engine 118 is configured to identify the authorization message (e.g., via another API between the payment network 106 and the access engine 118, etc.), sent from the event merchant 102, as being an access request, for example, based on content of the authorization request message 122, such as a unique event ID 124, etc. included in the authorization request message 122. The access engine 118 is configured to then search, in the access data structure 120, for a payment account link matching the access request, for example, matching transaction data included in the associated authorization request message 122. If a match is found, the access engine 118 is configured to return an authorization reply message 126 to the event merchant 102. The reply message 126 includes at least an access output and, potentially, additional details about the ticket purchased by the consumer 112 (e.g., a number of tickets purchased when appropriate; ticket details such as seat/section number, etc.; and other potentially useful information, etc.). For example, the reply message 126 illustrated in FIG. 1 includes the consumer's payment account number as data entry (DE) 2, the number of tickets purchased by the consumer (and, thus, the number of accesses allowed to the event) as DE 6, the MCC for the particular event as DE 18, and the event ID for the particular event as DE 42. Additional details, such as seat/section number(s), etc., may be included in the reply message 126 as additional data entries in other embodiments. In addition, in some embodiments, event/access details may be provided to the consumer 112 in the form of information displayed on a screen and/or printed on paper or similar media. Alternatively, if no match is found, the access engine 118 is configured to return an authorization message to the event merchant 102, indicating a denial output for the consumer 112 to access the event.

FIG. 3 illustrates an exemplary method 300 of facilitating access to an event, for a consumer, through use of a payment account linked to such access to the event (e.g., via a ticket, etc.). The exemplary method 300 is described herein in connection with the system 100, and may be implemented in the access engine 118 of the system 100. Further, for purposes of illustration, the exemplary method 300 is also described with reference to computing device 200. However, it should be appreciated that the method 300, or other methods described herein, are not limited to the system 100, or computing device 200. And, conversely, the systems and computing devices described herein are not limited to the exemplary method 300.

As described in connection with the system 100, when a purchase of a ticket (or multiple tickets) for an event at the event site 114 is completed by the consumer 112, the access engine 118 is configured to generate a link (or association) between the purchased ticket (broadly, the access to the event) and a payment account associated with the consumer 112. The payment account may be the payment account used by the consumer 112 to purchase the ticket, or it may include another payment account associated with the consumer 112 and specifically selected by the consumer 112 for association with the ticket. The link between the ticket purchased by the consumer 112 and the consumer's payment account is then stored in the access data structure 120 associated with the access engine 118. With that said, in various embodiments, the consumer 112 may voluntarily register with the access engine 118 for such linking, or the consumer 112 may be provided an option to link a payment account with the ticket during purchase, or the linking option may be provided to the consumer 112 as an optional service by one or more of the payment network 106, the issuer 108, etc.

It should be appreciated that the ticket may be purchased by the consumer 112 from the event merchant 102, as described in connection with the system 100, or from another merchant selling tickets to the same event (e.g., on behalf of the event merchant 102, separate from the event merchant, etc.). In either case, the access engine 118 is configured to identify the purchase (e.g., based on transaction data generated in response to the purchase, etc.) and link the ticket to a payment account associated with the consumer 112. Or, the consumer 112 may voluntarily link the purchased ticket to a payment account, independent of the actual purchase. In addition, the consumer 112 may purchase multiple tickets to the event, and the access engine 118 may then link the multiple tickets to the consumer's selected payment account. Further, the consumer 112 may purchase tickets to multiple different events, and the access engine 118 may link the different tickets to the consumer's selected payment account.

In any case (and regardless of how or when the consumer's ticket is linked to the consumer's selected payment account), when the consumer 112 desires to access the event for which the ticket was purchased, the consumer 112 presents information to the event merchant 102, at the event site 114 for the event, regarding the consumer's payment account linked to the purchased ticket (e.g., an account number, etc.). In response, the event merchant 102 generates an access request for the event (e.g., message 122 in FIG. 1, etc.), and transmits the access request along path A in the system 100. The access request includes payment account data for the consumer's payment account as well as event data for the event to which access is being requested. In addition, the access request includes an event identifier that distinguishes the access request from other transaction messages transmitted along path A (e.g., event ID 124 in FIG. 1, etc.). As such, in the method 300, when the event identifier is recognized (e.g., by the payment network 106, etc.), the access request is routed to the access engine 118. In turn, and as shown in FIG. 3, the access engine 118 receives the access request from the event merchant 102, at 302.

As an example, the event merchant 102 may receive payment account information from the consumer 112 via the POS terminal 116 at the event (e.g., from a payment device presented by the consumer 112 to the POS terminal 116, etc.). In response, the POS terminal 116 may generate an access request that includes an ISO 8535 authorization request message, and transmit the message along path A in the system 100. The authorization request message includes details regarding the event (e.g., a name of the event, a location of the event, a date of the event, etc.) and the consumer's payment account (e.g., a payment account number, etc.), as well as a particular MCC identifying the transaction as an access request transaction. In this example, as the message proceeds along path A in system 100, the payment network 106 identifies the particular MCC in the message and routes the message to an API associated with the access engine 118.

With continued reference to FIG. 3, upon receiving the access request from the event merchant 102, the access engine 118 searches, at 304, for a corresponding payment account link in the access data structure 120. For example, the access engine 118 may initially extract the consumer's payment account number and the pertinent event data for the event from the access request. The access engine 118 may then search (e.g., via key word searching, etc.) in the access data structure 120 for the consumer's payment account number to determine if the payment account is linked with the particular event to which access is requested. Alternatively, the access engine 118 may search in the access data structure 120 for the particular event, and then determine if the consumer's payment account number is associated with the particular event in order to determine if the payment account is linked with the event. In either case, the access engine 118 may also determine, as part of the search, how many tickets are available to the consumer 112 for use, and if any of the tickets have already been used/claimed.

When a matching link is identified in the access data structure 120, at 306, the access engine 118 transmits an access output to the event merchant 102, at 308 (e.g., message 124 in FIG. 1, etc.). The access output indicates that the consumer's payment account is linked to the ticket for the particular event (e.g., that the consumer 112 has in fact purchased the ticket for the event, etc.), such that the event merchant 102 can allow the consumer 112 to access the event. In addition, the access engine 118 may optionally (as indicated by the broken lines in FIG. 3) include in/with the access output, at 310, details of the ticket purchase (e.g., as determined by the access engine 118 during the search at 304, etc.). For example, the access engine 118 may include, with the access output, an indication (or indicator) of access to the particular event, as well as seat/section numbers, a total number of tickets purchased, and a total number of tickets used, etc.

In connection with the above example, the access output may include an ISO 8535 authorization reply message. Here, when the access engine 118 determines that the consumer's payment account is linked to the particular event to which access is requested, the access engine 118 generates the reply message and transmits the message to the POS terminal 116 back along path A in the system 100. In particular, the access engine 118 transmits the reply message to the payment network 106, which in turn transmits the reply message to the POS terminal 116 via the acquirer 104. In this example, and as shown in the system 100, the reply message includes (without limitation) the consumer's payment account number as DE 2, the number of tickets purchased by the consumer (and, thus, the number of accesses allowed to the event) as DE 6, the MCC for the particular event as DE 18, and the event ID for the particular event as DE 42. The reply message thus represents a zero transaction through the payment network 106. In some embodiments, the authorization reply message may include one or more extended data elements (or entries) which may contain additional event and/or access information. For instance, the extended data elements may include seat numbers, etc. Then, the POS terminal 116 may print the extended data elements, such as the seat numbers, etc., for the purpose of granting entry and/or providing the consumer 112 with additional access and/or event information.

Alternatively in the method 300, when a matching link is not identified by the access engine 118, at 306, the access engine 118 transmits a denial output to the event merchant 102, at 312. The denial output indicates that the consumer's payment account is not linked to the ticket for the particular event, such that the event merchant 102 can allow the consumer 112 to access the event. In connection with the above example, and as described for the access output, the denial output may include an ISO 8535 authorization reply message generated by the access engine 118 and transmitted to the POS terminal 116 in similar fashion to the access output.

FIG. 4 illustrates an exemplary access interface 400 that may be displayed at the POS terminal 116 and/or at a portable computing device associated with one or more of the consumer 112 and the event merchant 102 (as defined by instructions therein) in connection with either the access output or the denial output for an event access request. The interface 400 includes an indication 402 of a particular event (i.e., ABC Concert) to which a consumer is requesting access, as well as an identification 404 of the consumer (i.e., John Smith) and the consumer's linked payment account number. The interface also includes buttons 406, 408 that are configured to be highlighted to indicate that access is either granted to the particular event or denied, respectively.

In the illustrated embodiment, the interface 400 is displayed in connection with access being granted to the event ABC Concert. As such, the button 406 indicating that access is granted to the event is highlighted. In addition, the interface 400 identifies, at the button 406, particular details regarding the event, including the total number of tickets available to John Smith for the event and the section/seat numbers for each of the tickets.

With that said, other interfaces and/or access inputs or outputs may be used in connection with the system 100 of FIG. 1 and/or the method 300 of FIG. 3. In other embodiments, for example, access interfaces may include additional and/or different fields and/or formats providing additional and/or different data to the event merchant 102 and/or consumer 112 for review/consideration when deciding access to a particular event.

It should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving an access request for an event, the access request associated with a consumer requesting access to the event and identifying a payment account associated with the consumer; (b) searching in a data structure, for said identified payment account; (c) when the identified payment account is found in the data structure, verifying that the identified payment account is associated with the event; (d) when association of the payment account and the event is verified in the data structure, causing an access output to be generated at said event, whereby the consumer is permitted access to the event, based on the access output, without separately presenting credentials; (e) transmitting the access output to a point-of-sale (POS) device via a payment network; and (f) when the identified payment account is not found in the data structure or when association of the payment account and the event is not verified in the data structure, causing a denial output to be generated at said event, whereby the consumer is denied access to the event.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in facilitating access to events through payment account links, the system comprising:

a memory comprising a data structure of payment account links, each link including an event ID for a particular event in association with a payment account identifier for a payment account thereby associating the payment account with access to the particular event corresponding to the event ID;

a payment network configured to:

receive and forward authorization request messages relating to purchase transactions to issuers associated with payment accounts of consumers to which the purchase transactions are directed; and forward authorization reply messages from the issuers associated with the payment accounts of the consumers to which the purchase transactions are directed toward merchants involved in the purchase transactions; and an access engine computing device coupled to the memory and in communication with the payment network, the access engine computing device configured to link a payment account with access to an event in response to a consumer purchasing such access, and store such payment account link in the memory;

wherein the payment network is further configured to:

identify a given authorization request message, from a point-of-sale (POS) device at a site associated with a particular event, as an access request by a consumer for the event in response to the inclusion of a unique merchant category code (MCC) in the given authorization request message; and transmit the authorization request message identified as the access request to the access engine computing device in response to the identification of the unique MCC in the identified authorization request message; and wherein the access engine computing device is further configured to:

receive, via the payment network, the identified authorization request message, the identified authorization request message including a payment account number for a payment account associated with the consumer, an event identifier for the particular event, and the unique MCC identifying the authorization request message as the access request for access to the particular event;

in response to the identified authorization request message, identify one of the payment account links stored in the memory associated with the consumer's payment account number;

when a payment account link is identified in the memory matching the consumer's payment account number and the event identifier included in the identified authorization request message, generate an authorization reply message in response to the identified authorization request message and transmit the authorization reply message as an access output, via the payment network, to the POS device at the site associated with the particular event that indicates the consumer is permitted access to the event based on the access output without separately presenting additional consumer credentials, wherein the authorization reply message responding to the identified authorization request message originates at the access engine computing device instead of at an issuer of the consumer's payment account; and when a payment account link is not identified in the memory matching the consumer's payment account number and the event identifier included in the identified authorization request message, generate an authorization reply message in response to the identified authorization request message and transmit the authorization reply message as a denial output, via the payment network, to the POS device at the site associated with the particular event that indicates the consumer is not permitted access to the event.

2. The system of claim 1, wherein the payment network is associated with processing transactions made with the consumer's payment account.

3. The system of claim 1, wherein the authorization reply message includes an indicator associated with a number of accesses available to the consumer.

4. The system of claim 1, further comprising the POS device.

5. The system of claim 1, wherein the memory is included in the access engine computing device.

6. The system of claim 5, wherein the payment network includes the access engine computing device.

7. The system of claim 1, wherein the payment network includes the access engine computing device.

8. A computer-implemented method for use in facilitating access to an event by a consumer based on an association between a payment account of the consumer and the access to the event, the method comprising:

receiving, by a payment network, and forwarding an authorization request message relating to a purchase transaction to an issuer associated with a payment account of a consumer to which the purchase transaction is directed, the purchase transaction specific to access to an event;

forwarding, by the payment network, an authorization reply message from the issuer toward a merchant involved in the purchase transaction;

linking, by an access engine computing device, the payment account with access to an event in response to the purchase transaction;

storing, by the access engine computing device, the link between the payment account and the access in memory;

identifying, by the payment network, a given authorization request message, from a point-of-sale (POS) device at a site associated with the event, as an access request by a consumer for the event in response to inclusion of a unique merchant category code (MCC) in the given authorization request message;

transmitting, by the payment network, the identified authorization request message as an access request to the access engine computing device;

receiving, by the access engine computing device, the identified authorization request message, the identified authorization request message including a payment account number for the payment account associated with the consumer, an event identifier for the event, and the unique MCC identifying the authorization request message as the access request for access to the event;

in response to the identified authorization request message, identifying, by the access engine computing device, said link stored in the memory based on the payment account number;

in response to said link identified in the memory matching the event identifier included in the identified authorization request message, generating, by the access engine computing device, an authorization reply message for the identified authorization request message; and transmitting, by the access engine computing device, the authorization reply message as an access output, via the payment network, to the POS device at the site associated with the event, the authorization reply message indicating the consumer is permitted access to the event based on the access output without separately presenting additional consumer credentials, wherein the authorization reply message responding to the identified authorization request message originates at the access engine instead of at an issuer of the payment account.

9. The method of claim 8, wherein the authorization reply message includes an indicator associated with a number of accesses available to the consumer.

10. The method of claim 8, wherein the memory is included in the access engine computing device.

11. The method of claim 10, wherein the payment network includes the access engine computing device.

* * * * *